US009180651B1

(12) United States Patent
Pepin et al.

(10) Patent No.: US 9,180,651 B1
(45) Date of Patent: Nov. 10, 2015

(54) LOW TEMPERATURE SHRINK WRAP FILM AND METHODS OF USE

(71) Applicant: Cool Wraps, Inc., Ponte Vedra, FL (US)

(72) Inventors: Gregory Pepin, Ponte Vedra, FL (US); Guy R. Beretich, Jr., Chapel Hill, NC (US)

(73) Assignee: Cool Wraps, Inc., Ponte Vedra, FL (US)

( * ) Notice: Subject to any disclaimer, the term of this patent is extended or adjusted under 35 U.S.C. 154(b) by 0 days.

(21) Appl. No.: 14/446,564

(22) Filed: Jul. 30, 2014

(51) Int. Cl.
*B32B 27/30* (2006.01)
*B32B 27/32* (2006.01)
*B32B 27/34* (2006.01)
*B65D 33/16* (2006.01)
*B65D 75/00* (2006.01)
*B65D 33/00* (2006.01)
*B65B 53/02* (2006.01)
*C08F 110/06* (2006.01)

(52) U.S. Cl.
CPC ............... *B32B 27/32* (2013.01); *B32B 27/304* (2013.01); *B32B 27/34* (2013.01); *B65B 53/02* (2013.01); *B65D 33/00* (2013.01); *B65D 33/1691* (2013.01); *B65D 75/002* (2013.01); *C08F 110/06* (2013.01)

(58) Field of Classification Search
CPC ................... Y10T 428/1328; Y10T 428/1331; Y10T 428/1334; Y10T 428/1341; Y10T 428/1345; B65D 33/00; B65D 71/08; B65D 71/12; B65D 71/14; B65D 71/40; B65D 71/42; B65D 71/46; B32B 27/304; B32B 27/32; B32B 27/34
USPC ...................... 428/34.9, 35.1, 35.2, 35.4, 35.5
See application file for complete search history.

(56) References Cited

U.S. PATENT DOCUMENTS

| | | |
|---|---|---|
| 5,866,663 A | 2/1999 | Brookhart et al. |
| 5,880,241 A | 3/1999 | Brookhart et al. |
| 5,891,963 A | 4/1999 | Brookhart et al. |
| 6,218,493 B1 | 4/2001 | Johnson et al. |
| 6,310,163 B1 | 10/2001 | Brookhart et al. |
| 6,405,869 B1 | 6/2002 | Whittemore et al. |
| 6,573,353 B1 | 6/2003 | Brookhart et al. |
| 6,894,134 B2 | 5/2005 | Brookhart et al. |
| 7,271,231 B2 | 9/2007 | Brookhart et al. |
| 2006/0278688 A1* | 12/2006 | Learn ..................... 229/116.1 |

* cited by examiner

*Primary Examiner* — Walter B Aughenbaugh
(74) *Attorney, Agent, or Firm* — Triangle Patents, PLLC

(57) ABSTRACT

A heat shrinkable film is constructed and configured for enclosing an object and applying directed heat to substantially conform the film to the external shape of the object for providing a temporary wrapping thereof.

22 Claims, 16 Drawing Sheets

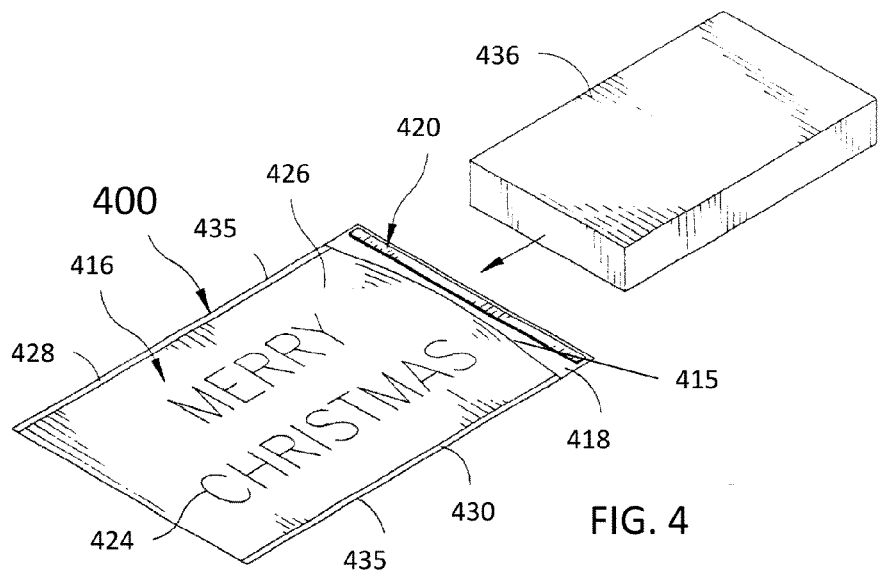

x>y, x=y or x<y x>y

1000 x<y

1150

LOW TEMPERATURE SHRINK WRAP FILM AND METHODS OF USE

BACKGROUND OF THE INVENTION

1. Field of the Invention

The present invention relates to shrink wrap packaging, and more specifically to shrink wrap gift bags configured, arranged and manufactured for standard gift boxes so that upon the application of heat from a conventional hair dryer, or similar heat source, the packaging neatly conforms to the box configuration and results in an aesthetically appealing outer wrapping.

2. Description of the Prior Art

Heat shrink wrapping is generally known in the prior art. Heat shrink wrappings are commonly used in industrial, commercial, and/or consumer applications for the packaging of boxes, for example, those that are to be sold at retail. The following documents are examples of known prior art:

U.S. Pat. No. 6,405,869 for Shrink wrap gift bag and method of manufacturing the same by Whittemore; et al. filed Jul. 1, 1999, issued Jun. 18, 2002, which describes a heat shrinkable gift bag configured for at-home shrink wrapping of gift boxes using a home hair dryer.

U.S. Pat. No. 7,271,231 for Polymerization of olefins by Brookhart; et al.; filed Oct. 20, 2003, issued Sep. 18, 2007 which describes a method for creating branched-chained olefin polymers with low glass transition temperatures.

U.S. Pat. No. 5,866,663 for Processes of polymerizing olefins by Brookhart; et al.; filed Jul. 10, 1997, issued Feb. 2, 1999 which describes a method for creating branched-chained olefin polymers with low glass transition temperatures.

U.S. Pat. No. 5,880,241 for Olefin polymers by Brookhart; et al.; filed Jan. 24, 1996, issued Mar. 9, 1999 which describes a method for creating branched-chained olefin polymers with low glass transition temperatures.

U.S. Pat. No. 5,891,963 for .alpha.-olefins and olefin polymers and processes therefor by Brookhart; et al.; filed Jul. 10, 1997, issued Apr. 6, 1999 which describes a method for creating branched-chained olefin polymers with low glass transition temperatures.

U.S. Pat. No. 6,218,493 for .alpha.-olefins and olefin polymers and processes therefor by Johnson filed Jul. 10, 1997, issued Apr. 17, 2001 which describes a method for creating branched-chained olefin polymers with low glass transition temperatures.

U.S. Pat. No. 6,310,163 for .alpha.-olefins and olefin polymers and processes therefor by Brookhart; et al.; filed Jul. 10, 1997, issued Oct. 30, 2001 which describes a method for creating branched-chained olefin polymers with low glass transition temperatures.

U.S. Pat. No. 6,573,353 for alpha.-olefins and olefin polymers and processes therefor by Brookhart, et al.; filed Sep. 12, 2000, issued Jun. 3, 2003 which describes a method for creating branched-chained olefin polymers with low glass transition temperatures.

U.S. Pat. No. 6,894,134 for alpha.-olefins and olefin polymers and processes therefor by Brookhart, et al.; filed Jun. 22, 2001, issued May 17, 2005 which describes a method for creating branched-chained olefin polymers with low glass transition temperatures.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

FIG. 4 is a perspective view of a shrink wrap bag constructed according to the present invention.

DETAILED DESCRIPTION OF THE PRESENT INVENTION

Figure 1A:
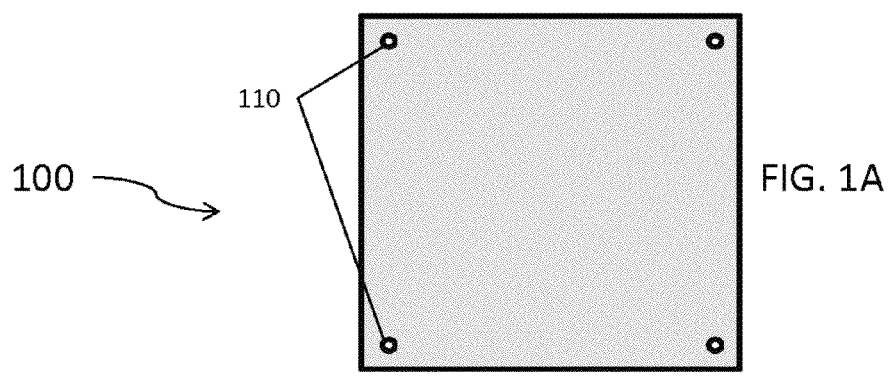
FIGS. 1A-C are perspective views of a planar wrap and a method for using it according to the present invention.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

Physicochemical Properties of the Film

The present invention provides a shrink wrap film having a low-shrink-temperature that allows application as a wrapping material over objects and that substantially conforms to the shape of the covered object upon the intentional, direct application of low temperature heat, wherein the low temperature heat is provided by a hair dryer or other heat application device providing low temperature directed heat approximating the temperatures of heat produced by a hair dryer. The present invention provides that the film is formed from any suitable material having an activated shrink temperature at low temperatures, preferably under 220 degrees F. In a preferred embodiment, the film is a polyolefin film, and more preferably a polypropylene film, formed according to novel manufacturing processes to allow controlled activated shrinkage at low temperature heat less than about 220 degrees F., and wherein the low temperature heat suitable for activating the shrink properties of the material, and wherein the low temperature heat is provided by a directed heat application device as described herein.

Other materials which are suitable for the present application include, but are not limited to, low temperature shrinkage polyolefins, polyethylene, nylon and polyvinyl chloride.

In one embodiment, the low temperature shrinkage film is an at least one component film, preferably a bi-component, co-extruded film wherein at least one of the components is selected from the group consisting of: polyolefins, polypropylene, polyethylene, nylon and polyvinyl chloride. In one embodiment, the bi-component, co-extruded film of the present invention includes a first component at a higher percentage of the overall film composition than the second component. In another embodiment, the bi-component, co-extruded film includes each of the two components at equal ratios to each other.

In general, the film comprises a flexible, low-temperature heat shrinkable plastic film having an activated shrink temperature of between about 140 degrees F. to about 220 degrees F. More specifically, the film comprises a polypropylene plastic material having an activated shrink temperature of between about 140 degrees F. to about 220 degrees F. In another embodiment, the film comprises at least one material having an activated shrink temperature of between about 140 degrees F. to about 220 degrees F. In yet another embodiment, the film comprises at least one material having an activated shrink temperature of between about 140 degrees F. to about 195 degrees F.

The film preferably has a gauge thickness of between about 70 gauge and about 120 gauge. More specifically, the plastic film comprises a polypropylene film having a gauge thickness of about 80 gauge and about 100 gauge.

The film preferably has shrink factors and a shrink ratio matched or suitable to the application method, and the desired final properties for shrinkage to substantially conform to the object enclosed within the film when low-temperature directed heat is applied for predetermined times and at predetermined distances from the film-enclosed object, as discussed hereinbelow, and as described in U.S. Pat. No. 6,405,869, which is incorporated herein by reference in its entirety.

In preferred embodiments of the present invention, the plastic film is formulated to provide a balanced shrink ratio, or balanced orientation, i.e., the plastic shrinks an equal amount in both the x and y (machine and transverse) orientations of the film, when the film is exposed to intentional, direct low temperature heat. The shrink factor is preferably between about 10% to about 40%. The balanced shrink ratio provides a uniform and consistent shrink profile, which will not distort the overall initial shape or configuration of the film, and/or distort any printed indicia or decorative patterns on the plastic film upon the application of heat.

In one embodiment of the present invention, the shrink ratio is unbalanced such that the film shrinks more in one direction than in another. An unbalanced shrink ratio can provide some film shape configurations shrink more appropriately or aesthetically, and may reduce folds or creases in the film as it conforms to the underlying, covered, and/or enclosed object, as described hereinbelow.

In another embodiment of the present invention, the film has a one-dimensional shrink factor. That is, the wrap shrinks along the transverse or machine axis, but not both. A one-dimensional shrink is useful for tube-type wrapping, as discussed hereinbelow.

In another embodiment of the present invention, the film is a bi-component, co-extruded film wherein the shrink factor is substantially balanced for the two components so that the film has controlled, predetermined shrinkage, for example as illustrated in Table 1, when directed, low-temperature heat between about 140 and about 220 degrees F. is applied for the times and at the distances from the film, such that the film substantially conforms to the object outer surface.

Shape Configuration

In various embodiments of the present invention, the film is provided in at least one shape, wherein the at least one shape can be configured as planar, folder-type, bag-shaped, continuous roll, and/or tubular.

The planar shape can be any planar shape, including a circle, oval, ellipse, crescent, curvilinear triangle, quatrefoil, parallelogram, square, rectangle, triangle, trapezoid, trapezium, kite, rhombus, regular polygonal, irregular polygon, tube, and/or continuous roll. In one example embodiment, a polygonal shape is designed to fold to enclose an object. The planar shape is operable to be folded to enclose the object to be packaged and held in place by a closure, such as an adhesive, a decorative fastener, a strap that gathers the excess, or by a strap threaded through holes in the planar shape, prior to directing the low temperature heat to shrink to more closely approximate the external shape of the object.

The outer edge of the planar shape of the film may include at least one adhesive, holes and/or other gathering means to allow the edges of the shape to be gathered together and secured before shrinkage. The gathering means thus provide for drawing and holding the edges together. Low temperature heat is then applied to the film to shrink it around the object to substantially conform to the outer shape or surface of the object, without melting or otherwise attaching to the object surface. In a preferred method, the heat is not applied to the edges of the film, but applied in a targeted section or area of the film that does note include the entire film shape, e.g., such that the edges do not shrink, while a majority of the body of the planar shape shrinks to substantially conform to or approximate the object outer surface shape.

Figure 1B:
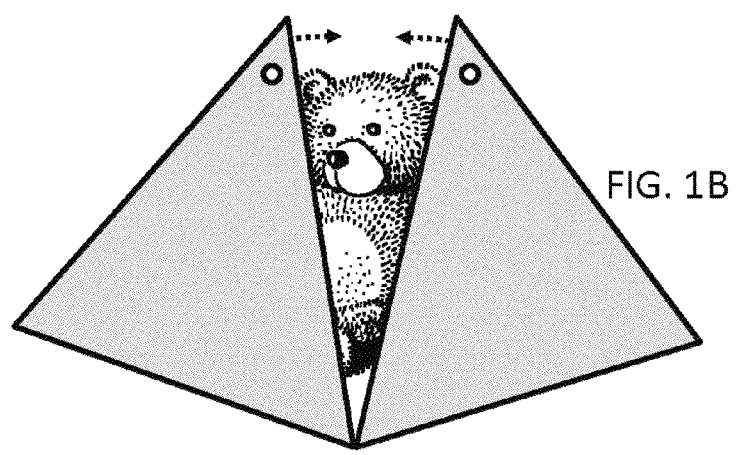
Figure 1C:
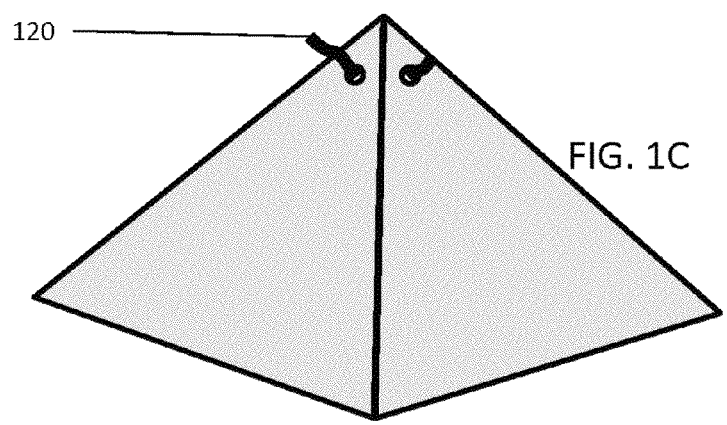
Figure 2:
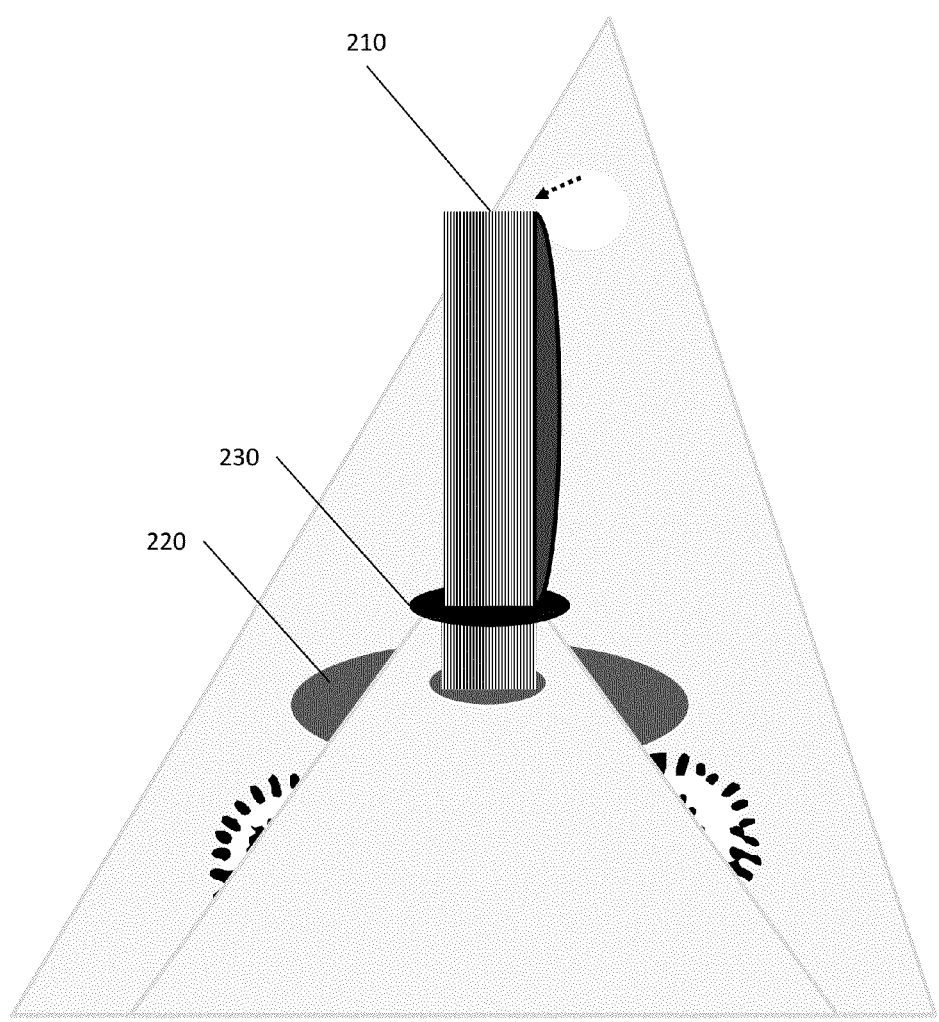
FIG. 2 is a perspective view of a planar wrap with strap handle according to the present invention.
Figure 3A:
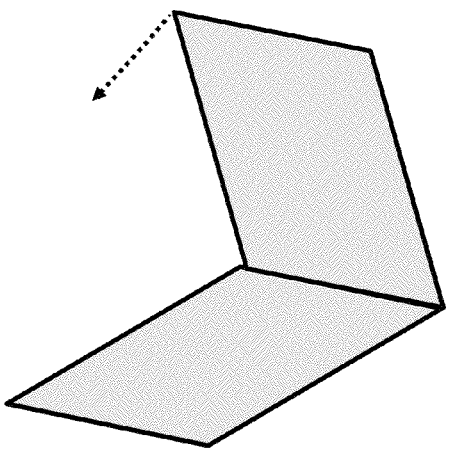
FIGS. 3A-D are perspective views of a shrink wrap folder being constructed according to the present invention.
Figure 3B:
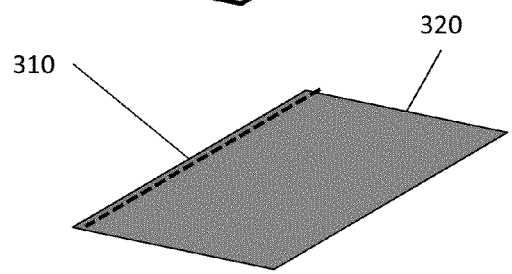
Figure 3C:
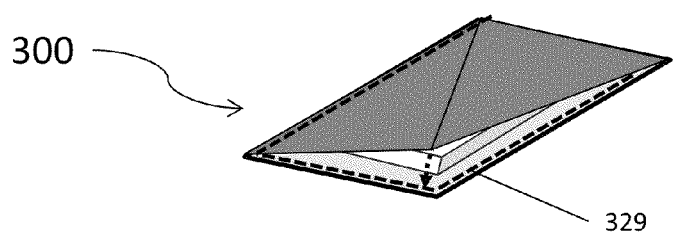
Figure 3D:
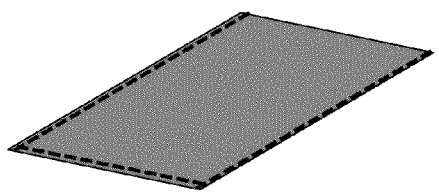
Figure 5:
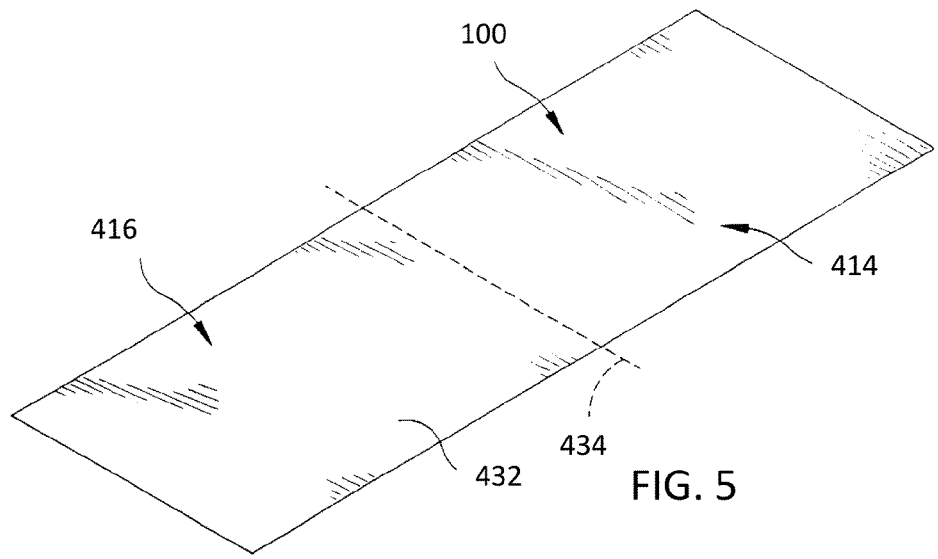
FIGS. 5-8 are perspective views of the manufacture of the embodiment of FIG. 4 according to the present invention.
Figure 6:
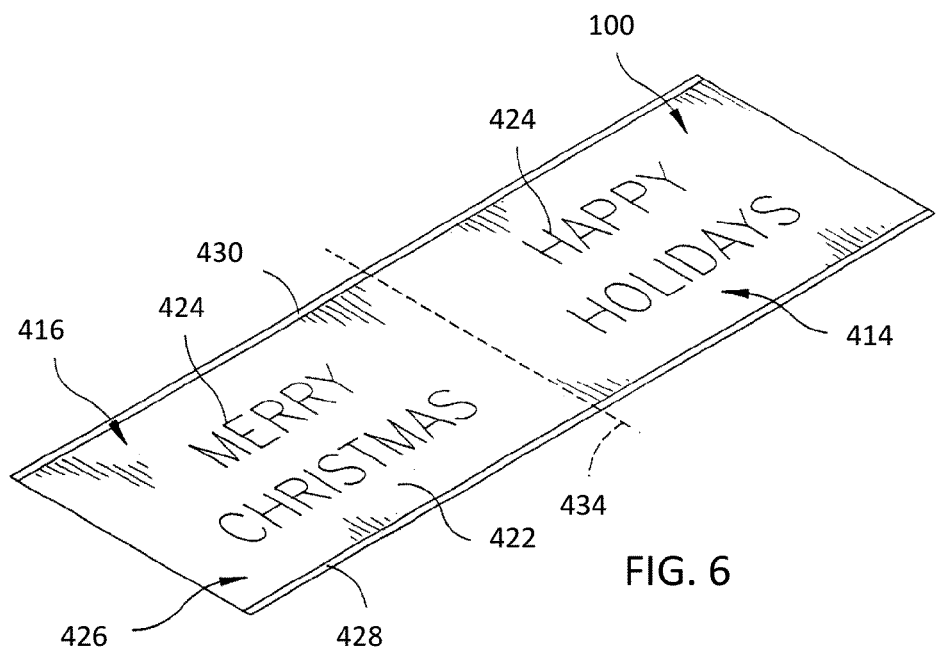
Figure 7:
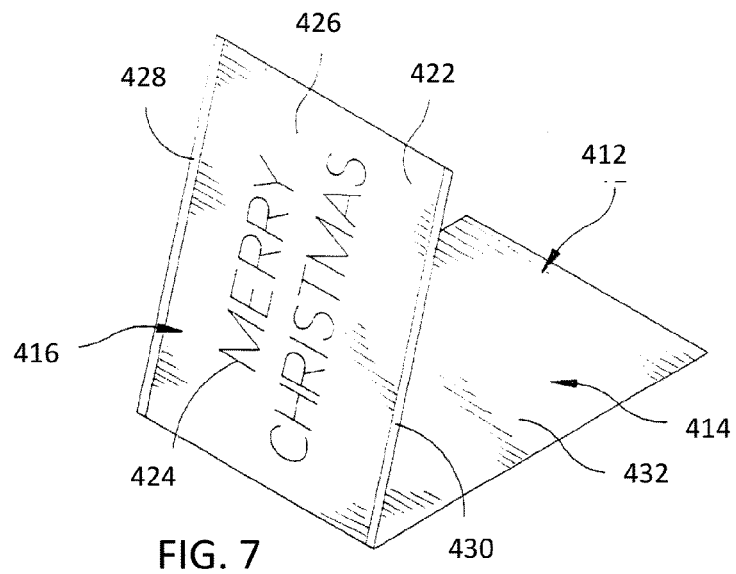
Figure 8:
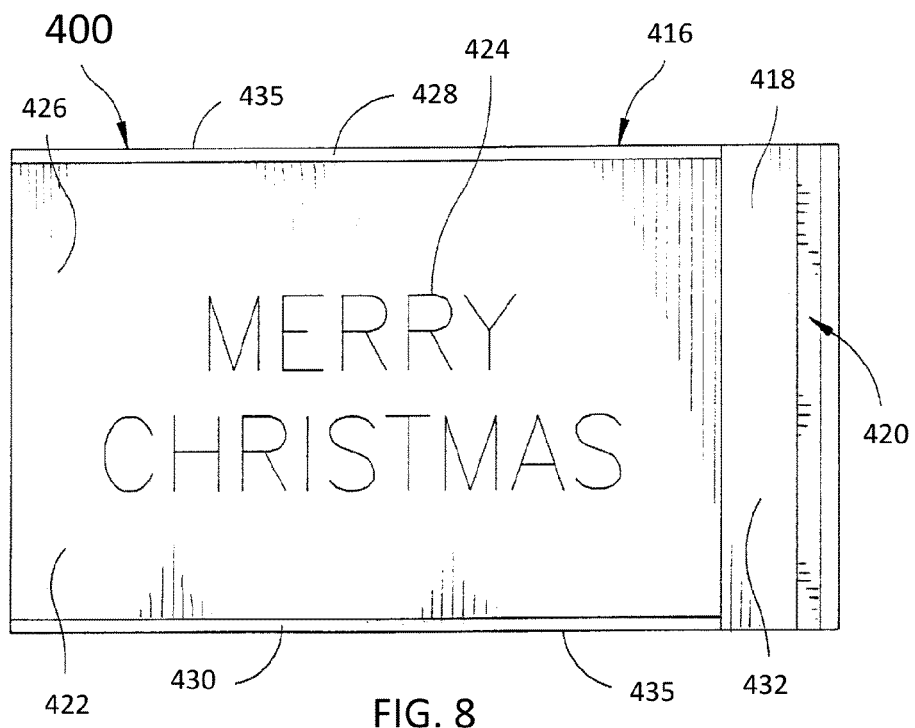

An example embodiment is shown in FIGS. 1 A, B, and C. Shown in FIG. 1A is a film planar shape, generally described as 100, that is then folded (FIG. 1B) to enclose, encase, or otherwise substantially conform to the shape of an object. In the illustrative embodiment including a square shape, the film has at least one closure hole 110 or other closure mechanism on the periphery of the film square shape. An object is placed in the center of the shape and the vertices of the planar shape are gathered together over the object. The excess film area is held together by a band or similar device, and the wrap is heat-shrunk. Alternatively, a strap, ribbon or similar type trans-film closure device 120 which spans the film through the hole is threaded through the holes and used to gather and cinch the edges together (FIG. 1C). Alternatively, in another embodiment, a strap 210 with a stopper 220 is inserted through the holes, the package is suspended by the strap, and the film is heat-shrunk (FIG. 2). For esthetic purposes, the corners of the planar shape can be interwoven and/or not shrunk. A small adhesive can be used to hold down the top corner to prevent it from sliding off the handle. Alternatively, a non-return device 230 can be included in the strap; for example, a sphere of diameter slightly larger than the holes in the film, but small enough that the film can stretch and slide over it, can be included just above the stop to hold the film down (FIG. 2). Other types of non-return devices can be used without departing from the scope of the invention.

In yet another embodiment of the present invention, the film may be folded and sealed along one edge to create a folder-type configuration, generally described as 300 in FIG. 3. The film is folded and heat-sealed along one edge 310 contiguous with the fold 320, thus forming a folder shape 300, as shown in FIG. 3. Adhesive is optionally placed on the remaining edges. To encase, enclose, or wrap an object, the object is inserted into the folder opening, and the edges are sealed. Low temperature heat (less than 140 degrees F.) is applied to the film to shrink the film to substantially conform to the external shape of the object. In preferred embodiments of the present invention, an adhesive 329 is applied to an area, either continuously or in predetermined spaced apart patterns (e.g., dotted lines of adhesive, continuous line or strip, spaced apart discrete sections, etc.) so that adhesive areas compared with non-adhesive areas are not visibly prominent after the film shrinks following intentional and direct exposure to low heat. The adhesive may be activated by removing a covering to expose a surface of the adhesive to other areas of the film and applying contact and/or at least some pressure, applying low temperature heat (less than 140 degrees F.) to activate the adhesive, etc.

The folder shape can also be formed into a cone-like shape to enclose an object (not shown). In this configuration, an object is placed inside the cone via the opening, the edges of the cone base are gathered and/or affixed together using any of the methods described herein; heat is applied to shrink the film to substantially approximate the object external shape.

As shown in FIG. 4, the film can be formed or configured into a side-weld bag, generally described as 400. The sheet of the plastic film is converted into a side-weld type bag 400 using conventional cutting, printing, and/or sealing processes (FIGS. 5-8). The sheet of film is first cut to the desired dimensions for the width of the bag. The outer surface 422 of the film is then printed with a desired design 424, preferably using solvent based, lamination grade inks. In this regard, the plastic film is preferably provided in a transparent clear or transparent coloration, or an opaque color, such as by way of example and not limitation white, and then over printed with decorative patterns and indicia, such as holiday or special occasion patterns, to simulate conventional wrapping material. A white background generally gives the inks a brighter appearance, but is not required. The inks are transferred to the film using a conventional flexographic printing process with rubber or photopolymer printing plates. It is important to note that printing of the sheet is preferably done only in a central printed area 426 extending in a longitudinal strip along the length of the film 100. The extreme side edges of the outer surface 422 are not printed, leaving narrow border strips 428, 430 along opposing side edges of the central printed area 426 which are devoid of any printed indicia. The absence of any printing inks in these border strips 428, 430 allows the use of less expensive seal bars, prevents the inks from melting and sticking to the seal bars, and generally facilitates welding of the side edges of the bag during manufacture. As long as the border strips 428, 430 are not too wide, the appearance of the borders will be minimized upon shrinkage of the bag 400 so that there very little un-printed areas adjacent to the weld lines of the bag. These border strips 428, 430 are approximately ⅛ to ½ inch wide, and more preferably about ¼ inch wide.

After printing, the sheets of film are loaded onto rolls and processed through a side-weld bag forming machine. More specifically, the inner surface 432 of the plastic film is folded over on itself along a transverse line 34 (shown in broken line) to define the rear bag panel 414 and a front bag panel 416, the front bag panel being shorter than the rear bag panel to form the extended lip 418. The lip 418 lip 418 should not be more than 2 inches long, and is preferably tapered or chamfered at the terminal corners. The front and rear bag panels 14, 16 are then welded along opposing side edges thereof forming side seams 35 to provide a closed bottom end, closed side edges and an open top end forming a mouth 415 of the gift bag. The non-shrinkable self-adhesive strip 330 is then disposed on the extended lip 418 of the rear bag panel 414 for use in sealing the mouth of the bag closed. The adhesive strip 330 comprises a thin film of self-adhesive material backed by a poly release strip which is removed at the time of use to expose the adhesive material beneath. The adhesive material may comprise any self-adhesive material which is not subject to shrinkage upon the application of heat. It is preferable that the self-adhesive strip does not shrink so as to maintain a neat, unbuckled appearance in the finished product. Suitable tape strips are commercially available, such as 3M brand closure tape HKC-71 (reclosable poly-backed strip). The above-noted methodology represents only a single example of the manner in which the bag may be formed. Other side welding machines operate in different manners and are equally suitable for the present task. For example, another side weld machine continuously folds the sheet of material along a longitudinal fold line and forms the side welds transversely across the sheet. In this regard, the un-printed border strips would extend laterally across the sheet, and the seal bars would strike the folded sheet along the un-printed border areas. These side welds sever individual bags from the folded sheet with the trailing side edge of one bag formed the leading side edge of the next. It is therefore to be understood that the scope of the invention is not to be limited in the manner in which the bags are formed. To be truly effective in providing a wrapping system which is easy to use and which provides a superior finished look, the bags must be manufactured in sizes appropriate for the boxes for which they will be used to wrap. As a general rule, the Applicants have found that the dimensions of the bag should generally be not more than 20% larger than the dimensions of the box, and preferably not more than 10-15% larger. Proper dimensioning of the bag will permit a loose accommodation of the box when first inserted, and then snugly and tightly engage the box when shrunk. For example, for a candy box having dimensions of approximately 10 inches by 17 inches by 1 inch, the bag should be approximately 11.5 inches wide by 18.5 inches long, the extra width and length of the flat bag accommodating the thickness of the box.

Figure 9:
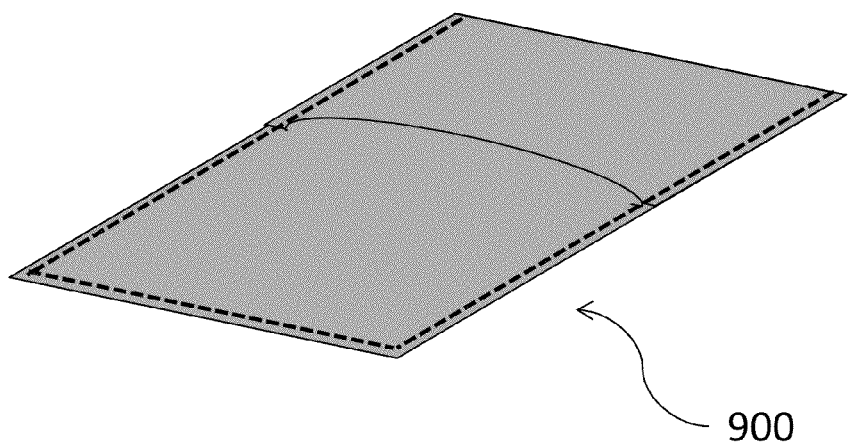
FIG. 9 is a perspective view a flip-top bag shrink wrap according to the present invention.

In another embodiment, the film is be formed into a flip-top bag, generally described as 900 in FIG. 9. A flip top bag is useful for packaging objects that are flexible and can be folded and inserted into the flip-top bag. The flip-top bag eliminates the need for a closure element. The shrinkage ratio of the film can be adjusted to reduce the longitudinal shrinkage, such that the flip-top overlap does not shrink to expose the enclosed object. Additionally or alternatively, an adhesive is used to seal the opening.

Figure 10A:
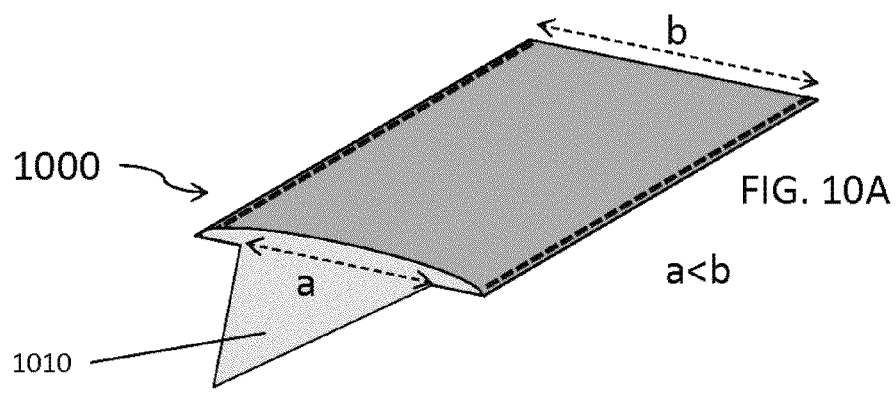
FIGS. 10A-C are perspective views of an extended lip bag shrink wrap according to the present invention.
Figure 10B:
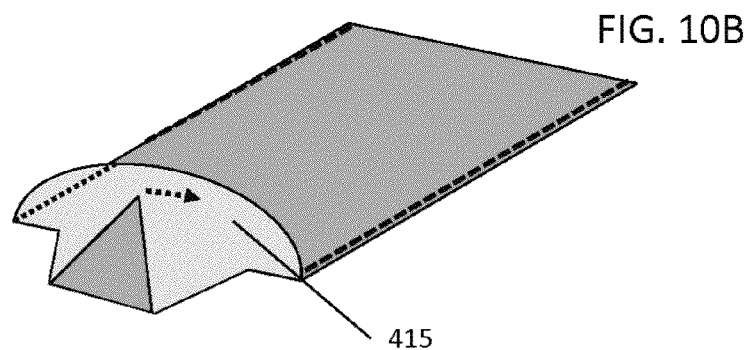
Figure 10C:
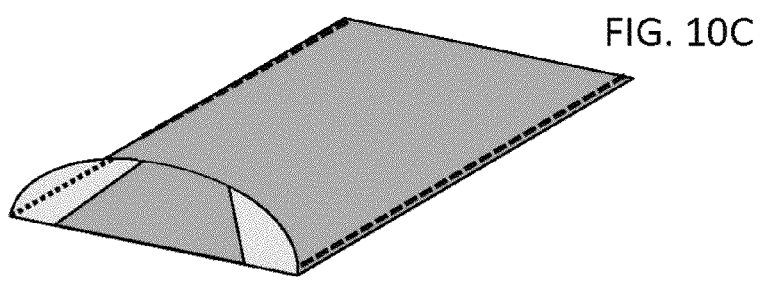
Figure 11A:
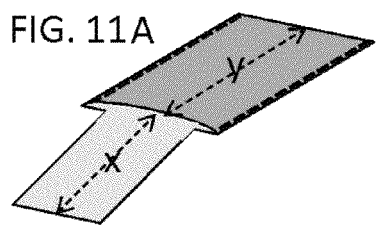
FIGS. 11 A-F are perspective views of additional extended lip bag shrink wraps according to the present invention.
Figure 11B:
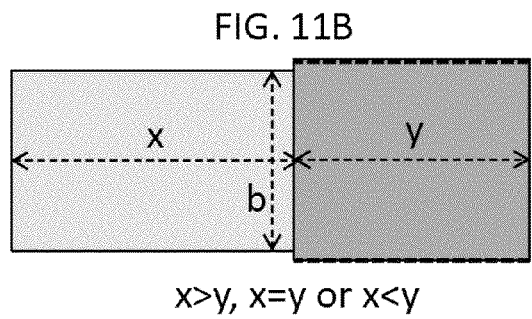
Figure 11C:
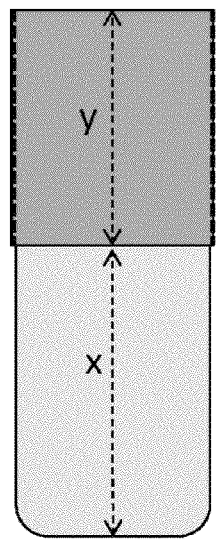
Figure 11D:
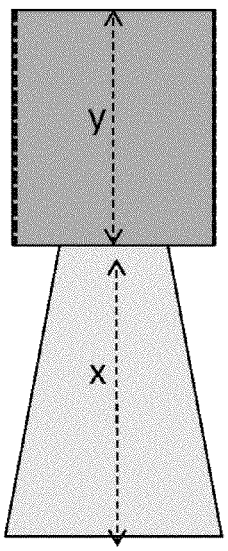
Figure 11E:
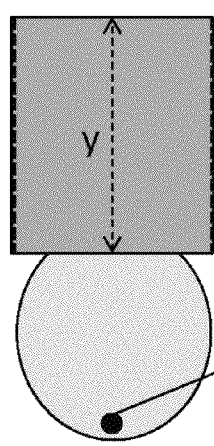
Figure 11F:
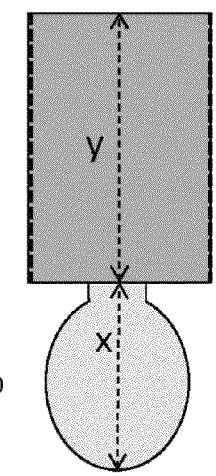

The flat film can also be formed into an extended lip bag shrink wrap, generally described as 1000 in FIGS. 10 and 11. An extended lip bag is designed and configured to include a lip 1010 such when an object is inserted into the bag, the lip is inserted into the bag mouth 415 over the object to be packaged, and the bag is shrunk to its final shape, the lip obstructs the now-shrunken mouth of the bag. This configuration creates a completely-enclosed object, wherein all surfaces of the object are covered by the film.

The lip is designed such that the distance "a" of the lip is equal to or less than the panel width "b" of the bag (FIG. 10). In a preferred embodiment, the lip distance a is less than the panel width b. In this manner the lip interferes less with the shrinkage of the mouth of the bag than if the lip distance "a" where to extend the length of the panel width "b". Different distances "a" and differences b-a can be used without departing from the scope of the invention.

The length of the lip x with respect to the length of the bag y can also be varied (FIG. 11 A-F). The length x can be greater than, less than, or equal to the length y. Longer lip lengths can be used to ensure closure of the bag mouth when packaging larger size objects. Thus, in a preferred embodiment, the distance x is greater than the panel width b of the bag to ensure that the package will be closed even if the mouth area only shrinks minimally.

The shape of the lip can be any shape that will cover the mouth of the bag (FIGS. 11 A-F). For example, rectangular (11A and B), rounded rectangular (11C) polygonal (11D), circular (11E), and circular with neck (11F) are some examples of shapes that can be used.

The extended lip bag configuration is useful because it requires no adhesives or other closure devices. However, an adhesive device 1150 shown in FIG. 11E can be put on the lip to temporarily adhere the lip to an object inside the bag to maintain the lip inside the bag when handling the bag with object before and during shrinkage.

Figure 12A:
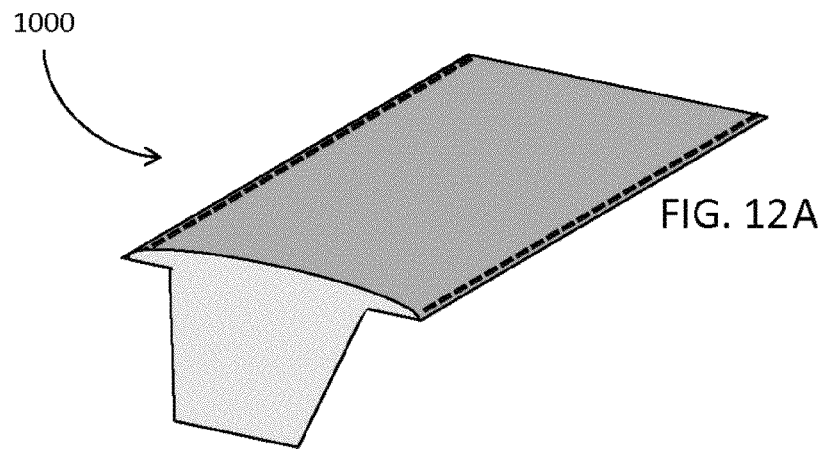
FIGS. 12A-C are perspective views of an additional extended lip bag shrink wrap with internal adhesive according to the present invention
Figure 12B:
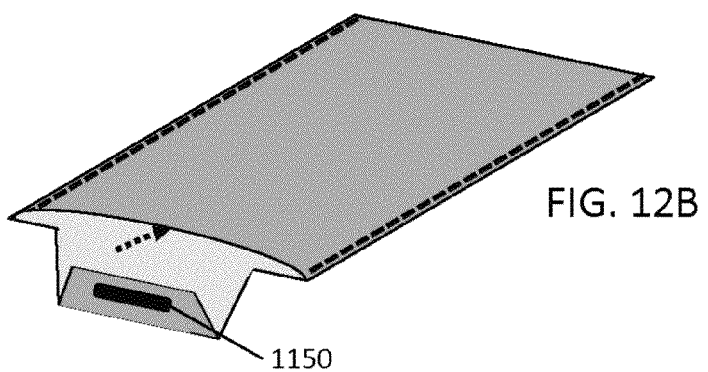
Figure 12C:
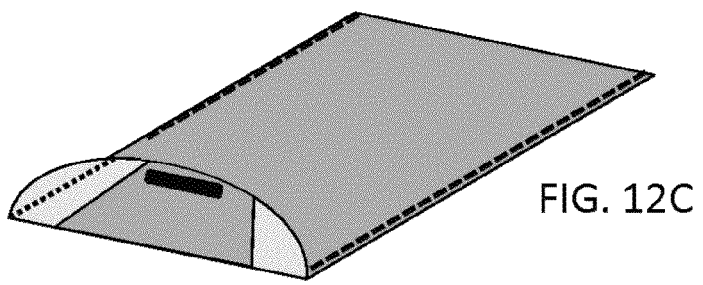
Figure 13:
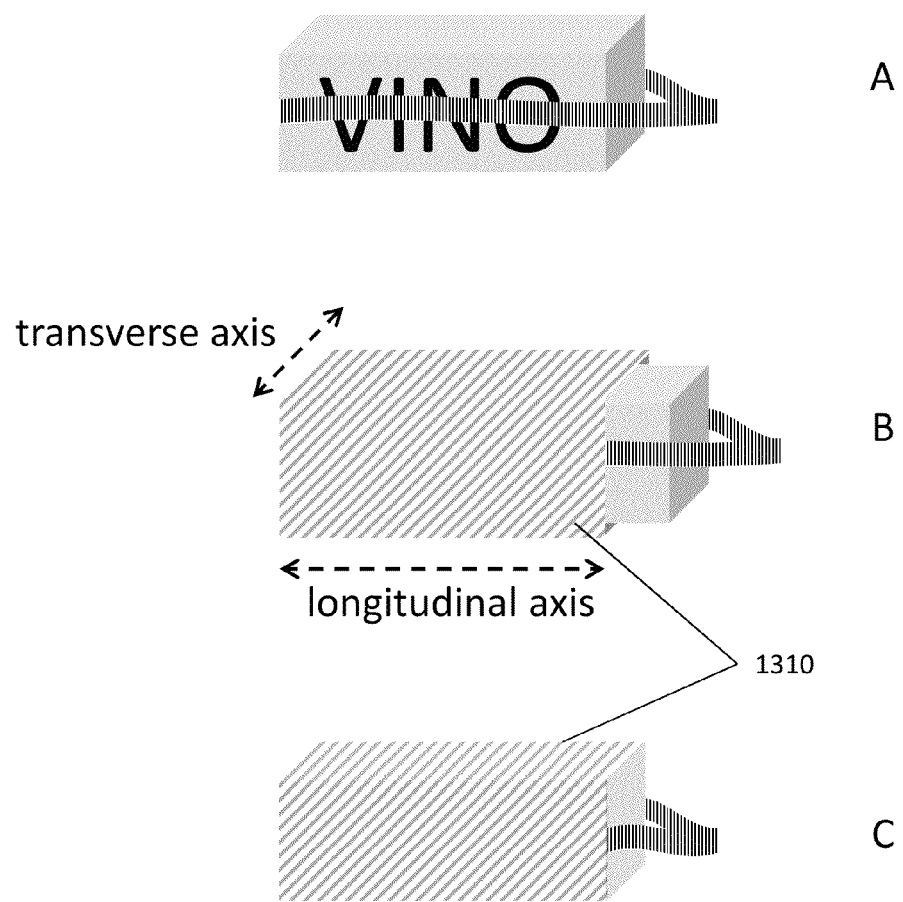
FIG. 13 is a perspective view a single-tube shrink wrap method in accordance with the teachings of the present invention.

Alternatively, the adhesive device may be positioned on the opposite side of the lip such that it will adhere to the inside of the front panel rather than the object (FIG. 12 A-C).

The lip may further include an attachment hole 1610 (FIGS. 16 and 17), in addition to the closure hole, for inserting a trans-film device before shrinking The bag-shaped configuration can be modified to include a dome-configuration. Dome configurations are well-known in the industry for wrapping spherical objects because the dome configuration provides for more efficient packaging of spherical objects. In this shape the bag has a special rounded dome end. The object is inserted into the bag and the open end is tied or sealed. The bag is then shrunk.

The film can also be formed into a tube-shape (FIGS. 13-16). The tube shape allows the shrink-wrap to be provided in a roll, and thus the user can cut the amount needed to wrap a particular object. The tubular shape allows for one or two pieces to be used to cover a package. In the one-tube configuration (FIG. 13A-C), a single tube 1310 is slid over the package and shrunk. A single tube wrap can be adequate for some packaging goals. If a complete covering of the object is desired (FIG. 14A-D), a second tube 1410 is slid over the package at 90 degrees, orthogonally, to the first tube and then shrunk. The first tube can be longer than the length of the package, in this way the excess will wrap around the exposed side. Then the second tube can be approximately the length of the second side, in this way it covers the excess from the first tube but does not crinkle around the ends of the package when it shrinks, thus providing a smoother packaging.

Alternatively, the shrink ratio of the tube can be adjusted to achieve smoother packaging. The shrink ratio is adjusted such that the tube only shrinks in one dimension—along the transverse axis of the tube, not longitudinally (See FIG. 13B). In this manner, the tube does not shrink in the longitudinal direction (along the tube) to expose the package underneath and therefore the wrap does not need to be longer than the package to account for shrinkage. In this way, a very smooth and uniform wrap can be achieved.

The tubular packaging configuration allows for the use of handles. In a one-tube configuration example, a strap, ribbon or similar handle component is applied to the package and the tube is shrunk over it to hold the handle component to the tube (FIGS. 8A-C). In a two tube configuration example embodiment, after the first tube is applied, the handle component is then applied to the package and the second tube is shrunk around the handle (FIGS. 9A-D). Other variations on these methods are possible without departing from the scope of the invention. For example, for heavier packages a loop of material is placed around the package and the first or second tube is slid over the loop and package. The loop is pulled in the desired direction until it contacts the bottom of the package and then the enclosing tube is shrunk. In this way the handle is held in position and also the loop provides support at the bottom of the package.

Figure 15A:
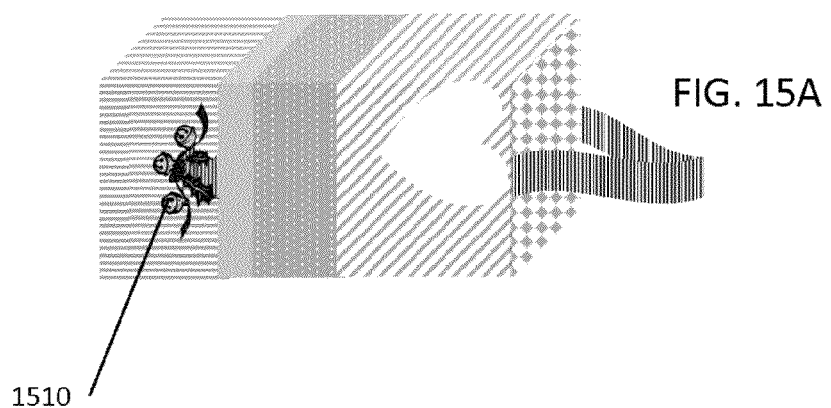
FIGS. 15A and B are perspective views of a multi-tube shrink wrapped package in accordance with the teachings of the present invention.

Alternatively, the handle may include larger diameter ends that prevent the handle from slipping through the film. For example, a strap with bells 1510 on the ends may be used (FIG. 15A). The second tube is shrunk around the ribbon and the bells prevent the ribbon from slipping through the tube.

Figure 14:
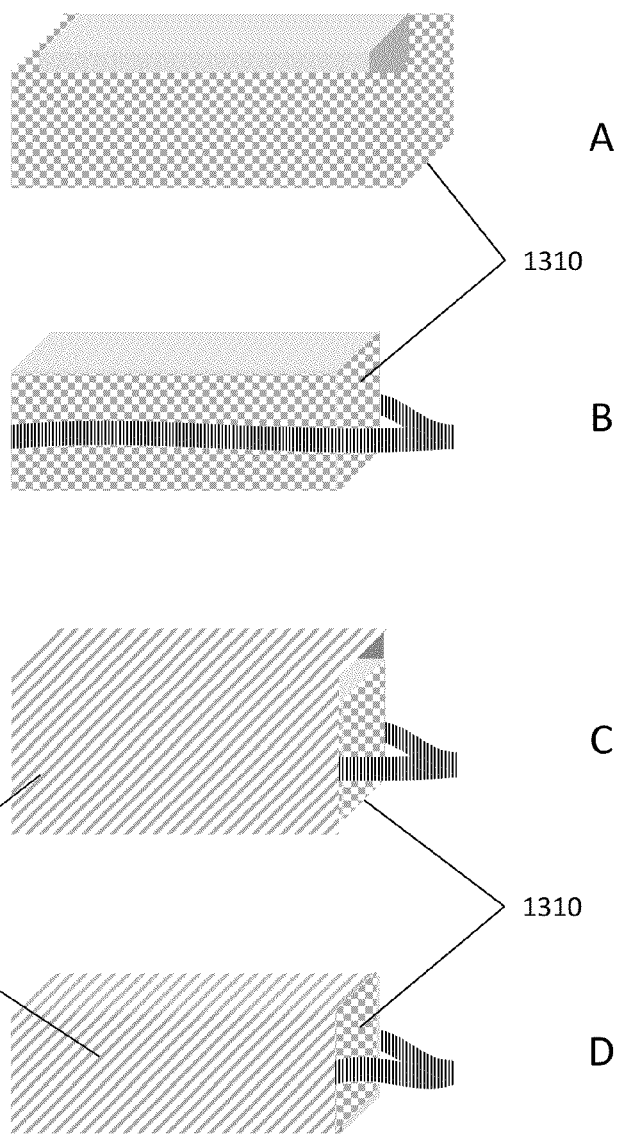
FIG. 14 is a perspective view a dual-tube shrink wrap method in accordance with the teachings of the present invention.

Using two tubes allows for different packaging combinations, rather than a single, uniform surface design on the package. An example is shown in FIG. 14, wherein the first tube is a different surface design than the second. For example, the first tube can be yellow and the second tube can be blue. The user can thus with a small number of wrap designs create multiple design combinations.

Figure 15B:
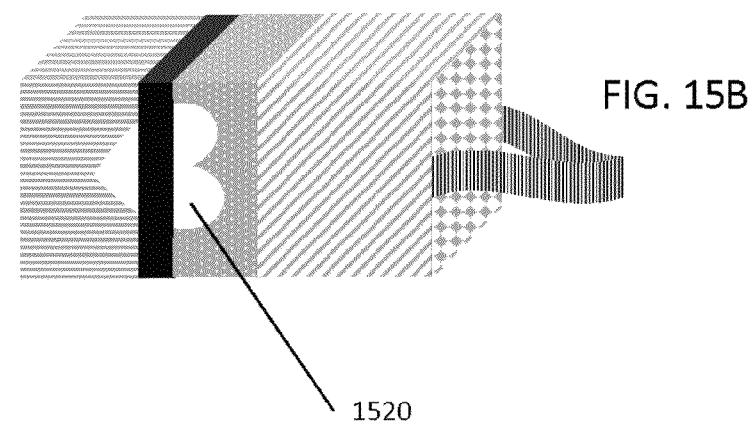

Multiple overlapping tubes can be used in either of the dimensions (FIGS. 15A and B). In addition to allowing even more design combinations, the method reduces waste because pieces that would otherwise be thrown away because too small can be used. As shown in FIG. 15B, small length tubes can also be used to hold external objects 1520 to the package.

Note that, for consumer products, waste is not as relevant as for commercial packaging; therefore, methods that may be more wasteful (e.g., two-piece tube wrapping), but aesthetically more pleasing are useful. However, the single-tube method uses less material than bag-type wraps. Furthermore, the ability to more accurately cut what is needed from a roll may reduce waste compared to the flat, bag and other shapes. Therefore, overall, the tube design can satisfy waste-conscious and esthetic-conscious consumers.

Closures are useful for multiple initial shape embodiments, including but not limited to the flat, cone, and/or bag configurations. As previously described, flip-top bags have an integrated closure, which may have a seal or no seal. The seal can be an adhesive seal, which can be applied as a continuous strip or dashes or dots. The adhesive can be any type of suitable adhesive, including contact adhesive and heat-activated adhesive.

Figure 16:
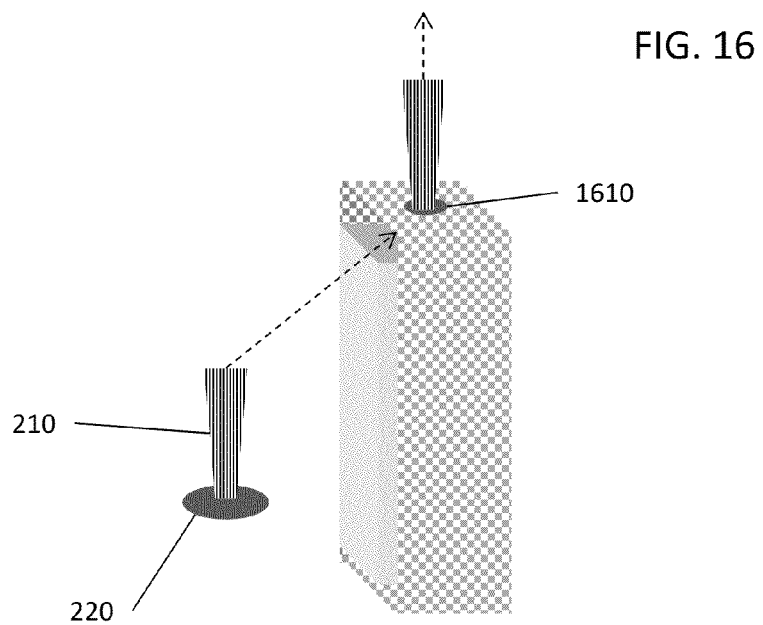
FIG. 16 is a perspective view of a handle application according to the present invention.
Figure 17A:
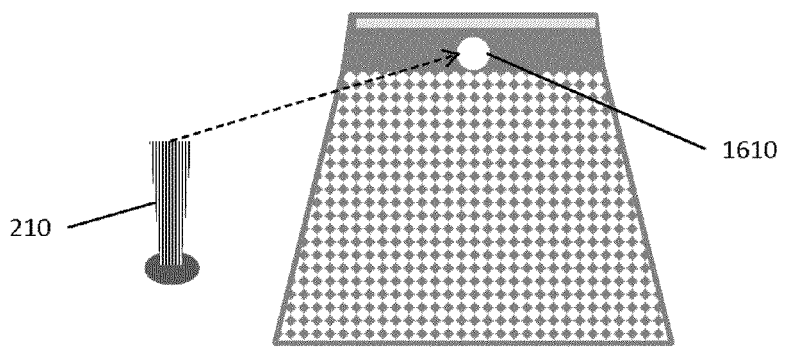
FIG. 17A-C are perspective views of a handle application according to the present invention.
Figure 17B:
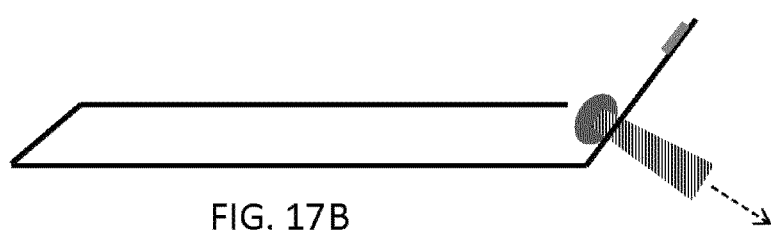
Figure 17C:

In yet another embodiment, the film includes holes to facilitate packaging. For example, attachment holes are provided to allow a handle to extend from the container through the film (FIGS. 2, 16, and 17). Closure holes are also be provided in an embodiment to draw the edges of the wrap together prior to shrinking (FIGS. 1 and 2) The holes can be at any location and for both purposes. In an example embodiment as shown in FIG. 1, for a flat film, the holes are at the edges of the film such that a component draws the edges together prior to shrinkage. Alternatively, a strap as used in FIG. 2 can be used to draw the holes together. The attachment hole can also be away from the edges of the film, for example in the center. In this way the handle can exit through a uniform, integral area of the film, which can be stronger and more esthetically pleasing. The gathered area can then be on the bottom and therefore less visible.

In some embodiments a handle may be included in a finished package. There are many types of handles that can be used. For example, holes in the film can be used as handles. Another handle type is one that adheres to the film.

Handles can also be integrated into the closures. For example, the handles can be grommets (Not shown). The grommets form a handle and increase the strength of the handle by distributing the weight of the package more evenly over the area of the film that supports the handle. Additionally, the grommets provide a more comfortable grip to the user by increasing the surface area over which the weight of the package is transferred to the user's hand. To wrap an object using a film with grommet handles, the user encloses the object with the wrap, places the grommet components in the appropriate holes, snaps the grommet components together, and then shrinks the wrap.

The handle(s) can be strap-type handles. These can be made of any flexible material with adequate tensile strength and comfort to the user. The straps can be configured and held to the package in a variety of ways, including: affixing the straps directly to the object to be packaged prior to wrapping with film; looping the strap around the object; providing a strap with adequate surface roughness such that the film will grip the strap adequately when shrunk and not allow the strap to slip out; and providing a strap with a stopper end.

The strap-type handles can have a large-diameter end, herein termed a stopper, which prevents the strap from pulling through the hole. For example, the strap can have a large washer-shaped structure on one end (FIGS. 2, 16, 17). The handle can be any configuration that has a first gripping portion that can be made to slide through the hole and a stopper that cannot slide through the hole and thus holds the handle to the package.

Additionally, a non-return device can be included in the strap. For example, a sphere of diameter slightly larger than the holes in the film, but small enough that the film can stretch and slide over it, can be included just above the stop to hold the film down (FIG. 2). Other types of non-return devices can be used without departing from the scope of the invention.

Figure 18:
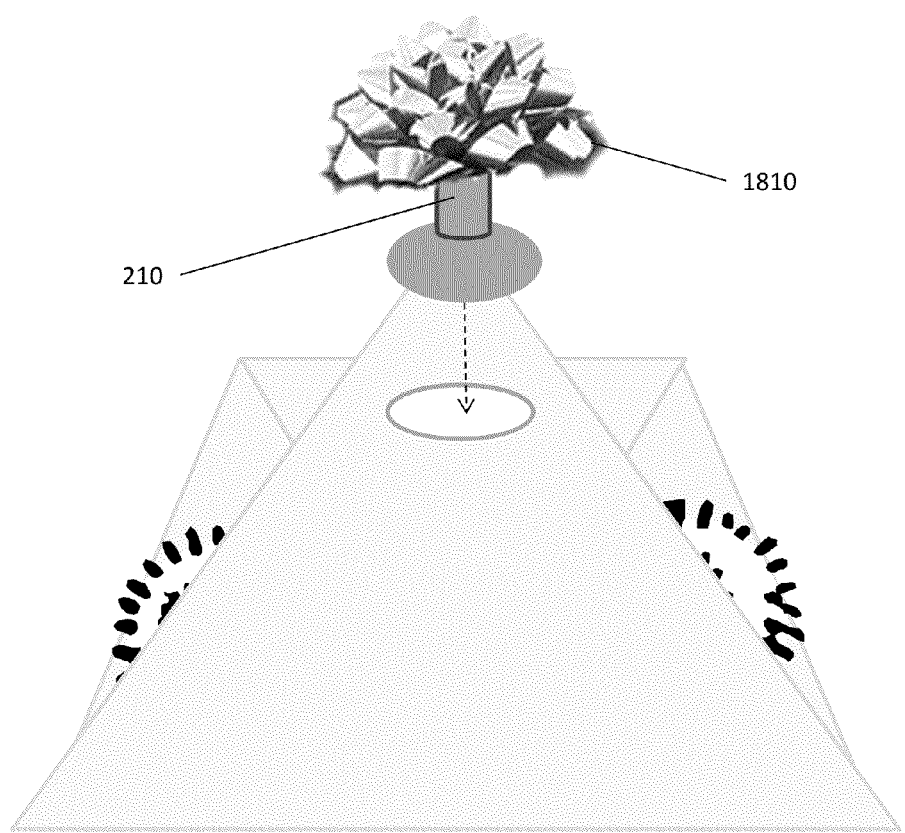
FIG. 18 illustrates a perspective view of a fastener application according to the present invention.

In another embodiment, a fastener can be used wherein a bow or other decorative element is attached to the exterior of the fastener and a non-return device is placed at the end of the fastener that is inserted into the holes, as shown in FIG. 18. FIG. 18 illustrates a perspective view of a fastener application 1810 according to the present invention. Because of the nature of the packaging, fasteners can be reused once a packaged has been opened.

Sizes

In use, the film and bags are provided a kit including at least one film embodiment, several of the same, or several different sizes which will be sized to accommodate a variety of different standard size gifts or gift boxes. Standard box sizes which are contemplated include, but are not limited to, a standard tie box, standard shirt box, video tape, compact disc, and wine bottle. Actual sizes include, but are not limited to, about 3-36" width×about 3-48" length x about 3-36"height. Tubes to cover standard boxes of 3-18" sides would have a tube diameter between about 4 inches and about 24 inches.

The user would select the appropriate size shape for use and then slide the gift into the shape or wrap it in the planar shapes. If a tape strip is used, the backing of the tape strip is removed and the lip folded over and sealed to the inside or outside of the front bag panel, or to the object, so that the majority of the slack of material is taken up. The user then applies heat to the entire package by waving a hot air source back and forth across the package. The finished product is a neatly wrapped gift box.

Surface Design

The film can include a surface design or texture. In a preferred embodiment, the surface design is printed on the film.

The outer surface of the film is printed with a desired design using solvent based, lamination grade inks. In this regard, the plastic film is preferably provided in an opaque color, such as white, and then over printed with decorative patterns and indicia, such as holiday or special occasion patterns, to simulate conventional wrapping material. A white background generally gives the inks a brighter appearance. The inks are transferred to the film using a conventional flexographic printing process with rubber or photopolymer printing plates. It is important to note that for some embodiments the printing of the sheet is done only in a central printed area extending in a longitudinal strip along the length of the film. The extreme side edges of the outer surface are not printed, leaving narrow border strips along opposing side edges of the central printed area which are devoid of any printed indicia. The absence of any printing inks in these border strips allows the use of less expensive seal bars, prevents the inks from melting and sticking to the seal bars, and generally facilitates welding of the side edges of the bag during manufacture. As long as the border strips are not too wide, the appearance of the borders will be minimized upon shrinkage of the bag so that there very little un-printed areas adjacent to the weld lines of the bag. These border strips are approximately ⅛ to ½ inch wide, and more preferably about ¼ inch wide.

The surface design can also include a texture. For example, a texture can be any type of texture, including fur, reptile skin, lace, rock, leather, textile fibers, sand, parchment, cloth (denim, burlap, knit), brushed metal and combinations thereof In an example embodiment, the surface design is a camouflage design. A camouflage polypropylene shrink wrap film according to the present invention is useful for providing a high-strength protective covering that can be applied at low temperature. Polypropylene is stronger and more weather-resistant than polyvinyl chloride, which yellows with UV exposure. Therefore, the present invention has a double advantage over the prior art in that it is easier to apply than previous polypropylene shrink wraps because of the low-temperature shrink range and also better suited than polyvinylchloride to applications that will be exposed to the elements.

Manufacture

After printing, the sheets of film are loaded onto rolls and processed through a side-weld bag forming machine. More specifically, the inner surface 432 of the plastic film is folded over on itself along a transverse line 434 (shown in broken line) to define the rear bag panel 414 and a front bag panel 416, the front bag panel being shorter that the rear bag panel to form the extended lip 418. The lip 418 should not be more than 2 inches long, and is preferably tapered or chamfered at the terminal corners. The front and rear bag panels are then welded along opposing side edges thereof forming side seams to provide a closed bottom end, closed side edges and an open top end forming a mouth of the gift bag. The non-shrinkable self-adhesive strip 330 is then disposed on the extended lip 418 of the rear bag panel 414 for use in sealing the mouth of the bag closed. The adhesive strip 330 comprises a thin film of self-adhesive material backed by a poly release strip, which is removed at the time of use to expose the adhesive material beneath. The adhesive material may comprise any self-adhesive material which is not subject to shrinkage upon the application of heat. It is preferable that the self-adhesive strip does not shrink so as to maintain a neat, unbuckled appearance in the finished product. Suitable tape strips are commercially available, such as 3M brand closure tape HKC-71 (reclosable poly-backed strip). The above-noted methodology represents only a single example of the manner in which the bag may be formed. Other side welding machines operate in different manners and are equally suitable for the present task. For example, another side weld machine continuously folds the sheet of material along a longitudinal fold line and forms the side welds transversely across the sheet. In this regard, the un-printed border strips would extend laterally across the sheet, and the seal bars would strike the folded sheet along the un-printed border areas. These side welds sever individual bags from the folded sheet with the trailing side edge of one bag formed the leading side edge of the next. It is therefore to be understood that the scope of the invention is not to be limited in the manner in which the bags are formed. To be truly effective in providing a wrapping system which is easy to use and which provides a superior finished look, the bag must be manufactured in sizes appropriate for the boxes for which they will be used to wrap. As a general rule, the applicant has found that the dimensions of the bag should generally be not more than 20% larger than the dimensions of the box, and preferably not more than 10-15% larger. Proper dimensioning of the bag will permit a loose accommodation of the box when first inserted, and then snugly and tightly engage the box when shrunk. For example, for a candy box having dimensions of approximately 10 inches by 17 inches by 1 inch, the bag should be approximately 11.5 inches wide by 18.5 inches long, the extra width and length of the flat bag accommodating the thickness of the box.

Thus, the present invention includes the following embodiments and methods: A heat shrinkable gift wrap film composed of a film of low temperature direct heat shrinkable polyolefin film formed into an initial shape; wherein the film has an activated shrink temperature of less than about 140 degrees F., which when applied to the film transforms the initial shape into a final shape that substantially conforms to an object surface placed under and/or enclosed by the film. In a preferred embodiment, the film is low temperature heat shrinkable polypropylene and the initial shape is selected from the group consisting of: circle, oval, ellipse, crescent, curvilinear triangle, quatrefoil, parallelogram, square, rectangle, triangle, trapezoid, trapezium, kite, rhombus, regular polygonal, irregular polygon, tube, bag, and continuous roll. In another preferred embodiment, the film is a bi-component, co-extruded film.

The film preferably includes, in another embodiment, at least one hole for insertion of a trans-film closure device, handle or decorative element.

A preferred initial shape is a folder composed of a single fold and a single welded side. In another preferred embodiment the initial shape is composed of a a side-weld bag wherein the plastic film is folded over on itself along a transverse line to define a rear bag panel and a front bag panel, the front bag panel being shorter than the rear bag panel to thereby form an extended lip, the front and rear bag panels being welded along opposing side edges thereof to thereby provide a closed bottom end, closed side edges and an open top end forming a mouth of the bag.

Another preferred initial shape includes a side-weld bag wherein the plastic film is folded over on itself along a transverse line to define a rear bag panel and a front bag panel, the front bag panel being shorter than the rear bag panel to thereby form an extended lip; the extended lip folded over to partially overlap the front bag panel; the front and rear bag panels being welded along opposing side edges thereof to thereby provide a closed bottom end, closed side edges and an open overlap forming a mouth of said heat shrinkable gift bag. In a preferred embodiment, the extended lip is insertable into the bag and has a length and a width such that the lip covers the mouth of the bag when the lip is inserted into the bag and the bag is heat-shrunk. In a preferred embodiment, the length of the lip is at least about 25% of the length of the front panel. In another preferred embodiment, the length of the lip is greater than the length of the front panel. In yet another preferred embodiment, the lip further includes an adhesive for adhering the lip to the object, the inside of the front panel, or the outside of the front panel.

The shape of the lip is preferably selected from the group consisting of: circle, oval, ellipse, crescent, curvilinear triangle, quatrefoil, parallelogram, square, rectangle, triangle, trapezoid, trapezium, kite, rhombus, regular polygon, and irregular polygon.

In another preferred embodiment, the initial shape is a tube that shrinks substantially only along the transverse axis. In yet other embodiments, the tube includes a hole for the insertion of a trans-film handle or decorative element and/or shrinkable decoration. The tube is sized to enclose standard size gift boxes, wherein the standard size gift box is selected from the range of about 3-36" width×3-48" length×3-36" height. Thus, the tube diameter is preferably between about 4 inches and about 46 inches. More preferably, the tube diameter is between about 4 inches and about 24 inches.

The present invention includes a heat shrinkable gift wrap film consisting of a low temperature, direct heat shrinkable, bi-component, co-extruded film, wherein at least one of the components is selected from the group consisting of: polyolefins, polypropylene, polyethylene, nylon and polyvinyl chloride; wherein the film is formed into an initial shape; and wherein the film has an activated shrink temperature of less than about 140 degrees F., which when applied to the film transforms the initial shape into a final shape that substantially conforms to an object surface placed under and/or enclosed by the film. The initial shape of the film is preferably selected from the group consisting of: circle, oval, ellipse, crescent, curvilinear triangle, quatrefoil, parallelogram, square, rectangle, triangle, trapezoid, trapezium, kite, rhombus, regular polygon, irregular polygon, tube, bag and continuous roll. In a preferred embodiment the film further includes at least one hole for insertion of a trans-film closure device, handle or decorative element.

A method for packaging an object with the present invention includes the steps of providing an extended lip side weld bag, the bag composed of a low temperature, direct heat shrinkable, at least one component film; inserting an object to be packaged in the bag; closing the bag; heat-shrinking the bag into the final shape.

In a preferred method, the film has an activated shrink temperature of less than about 140 degrees F., which when applied to the film transforms the initial shape into a final shape that substantially conforms to an object surface placed under and/or enclosed by the film. In another preferred method, the at least one component is a low temperature heat shrinkable polypropylene. In a further preferred method, the film is a bi-component, co-extruded film.

Another preferred method further includes a lip includes an adhesive for temporarily adhering the lip to the object and the method further includes the step of adhering the lip to the object before shrinking. Alternatively, the lip includes an adhesive for adhering the lip to the inside of the front panel and the method further includes the step of adhering the lip to the front panel before shrinking. In yet another alternative method, the lip includes an adhesive for adhering the lip to the outside of the front panel and the method further includes the step of adhering the lip to the front panel before shrinking Certain modifications and improvements will occur to those skilled in the art upon a reading of the foregoing description. The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

The invention claimed is:

1. A heat shrinkable gift wrap film consisting essentially of:
   a film of direct heat shrinkable polyolefin film formed into an initial shape and a heat activatable adhesive;
   wherein the film is a film composed of two polymers that are co-extruded to form the film;
   wherein the heat activatable adhesive is spaced apart on the film in a predetermined pattern; and
   wherein one of the two polymers is polypropylene;
   wherein the film has an activated shrink temperature of less than 140 degrees F., which when applied to the film transforms the initial shape into a final shape that substantially conforms to an object surface placed under the film and heat-activates the adhesive at less than 140 degrees F., causing the object to be enclosed by the film and causing areas of the film including the heat activatable adhesive to not be visibly prominent compared to non-adhesive areas of the film;
   wherein the predetermined pattern is selected from the group consisting of dotted lines and discrete sections.

2. The film of claim 1, wherein the initial shape is selected from the group consisting of:
   circle, oval, ellipse, crescent, curvilinear triangle, quatrefoil, parallelogram, square, rectangle, triangle, trapezoid, trapezium, kite, rhombus, tube, bag, irregular polygon, and continuous roll.

3. The film of claim 1, wherein the initial shape is a folder comprising a single fold and a single welded side.

4. The film of claim 1, wherein the initial shape comprises:
   a side-weld bag wherein the film is folded over on itself along a transverse line to define a rear bag panel and a front bag panel, the front bag panel being shorter than the rear bag panel to thereby form an extended lip, the front and rear bag panels being welded along opposing side edges thereof to thereby provide a closed bottom end, closed side edges and an open top end forming a mouth of the bag.

5. The film of claim 1, wherein the initial shape comprises:
   a side-weld bag wherein the film is folded over on itself along a transverse line to define a rear bag panel and a front bag panel, the front bag panel being shorter than the rear bag panel to thereby form an extended lip;
   the extended lip folded over to partially overlap the front bag panel;
   the front and rear bag panels being welded along opposing side edges thereof to thereby provide a closed bottom end, closed side edges and an open overlap forming a mouth of said heat shrinkable gift bag.

6. The film of claim 4, wherein the extended lip is insertable into the bag and has a length and a width such that the lip covers the mouth of the bag when the lip is inserted into the bag and the bag is heat-shrunk.

7. The film of claim 6, wherein the length of the lip is at least about 25% of the length of the front panel.

8. The film of claim 6, wherein the length of the lip is greater than the length of the front panel.

9. The film of claim 6, wherein the lip further includes the heat activatable adhesive for adhering the lip to the object.

10. The film of claim 6, wherein the lip further includes the heat activatable adhesive for adhering the lip to the inside of the front panel.

11. The film of claim 6, wherein in the shape of the lip is selected from the group consisting of:
    circle, oval, ellipse, crescent, curvilinear triangle, quatrefoil, parallelogram, square, rectangle, round rectangle, triangle, trapezoid, trapezium, kite, rhombus, circular with neck, and irregular polygon.

12. The film of claim 1, wherein the initial shape is a tube that shrinks substantially only along the transverse axis.

13. The film of claim 12, wherein the tube includes a hole for the insertion of a trans-film handle or decorative element.

14. The film of claim 12, wherein the tube includes shrinkable decoration.

15. The film of claim 1, wherein the initial shape is a bag.

16. The film of claim 1, wherein the film includes a texture other than that of the two polymers and the adhesive, wherein the texture other than that of the two polymers and the adhesive includes at least one of fur, reptile skin, lace, rock, leather, textile fibers, sand, parchment, denim, burlap, knit, brushed metal, and combinations thereof.

17. The film of claim 1, wherein the film includes a shrink ratio, and wherein the shrink ratio is unbalanced such that the film shrinks more in one direction than in another.

18. A heat shrinkable gift wrap film consisting essentially of:
    a direct heat shrinkable film and a heat activatable adhesive, the direct heat shrinkable film composed of two components that are co-extruded to form the film;
    wherein at least one of the components is selected from the group consisting of: polyolefins, nylon and polyvinyl chloride;
    wherein the heat activatable adhesive is spaced apart on the film in a predetermined pattern;
    wherein the film is formed into an initial shape; and
    wherein the film has an activated shrink temperature of less than 140 degrees F., which when applied to the film transforms the initial shape into a final shape that substantially conforms to an object surface placed under and/or enclosed by the film and heat-activates the adhesive at less than 140 degrees F., causing the object to be enclosed by the film and causing areas of the film including the heat activatable adhesive to not be visibly prominent compared to non-adhesive areas of the film;
    wherein the predetermined pattern is selected from the group consisting of dotted lines and discrete sections.

19. The film of claim 18, wherein the initial shape is a polygon.

20. The film of claim 18, further including at least one hole for insertion of a trans-film closure device, handle or decorative element.

21. The film of claim 18, wherein the initial shape is a bag.

22. A heat shrinkable gift wrap film consisting essentially of:
    a film of direct heat shrinkable polyolefin film formed into an initial bag shape and a heat activatable adhesive;
    wherein the film is a film composed of two polymers that are co-extruded to form the film; wherein one of the two polymers is polypropylene;
    wherein the heat activatable adhesive is spaced apart on the film in a predetermined pattern; and
    wherein the film has an activated shrink temperature of less than 140 degrees F., which when applied to the film heat-activates the adhesive at less than 140 degrees F. and transforms the initial shape into a final shape that substantially conforms to an object surface placed within the bag-shaped film, causing the object to be enclosed by the film and causing areas of the film including the heat activatable adhesive to not be visibly prominent compared to non-adhesive areas of the film;

wherein the predetermined pattern is selected from the group consisting of dotted lines and discrete sections.

\* \* \* \* \*